United States Patent
Räsänen et al.

(10) Patent No.: US 8,852,493 B2
(45) Date of Patent: Oct. 7, 2014

(54) METHOD OF FORMING A MOUTH ROLL TO A CUP OF PLASTIC COATED BOARD AND A CUP MADE BY THE METHOD

(75) Inventors: Jari Räsänen, Imatra (FI); Seppo Karine, Imatra (FI)

(73) Assignee: Stora Enso Oyj, Helsinki (FI)

( * ) Notice: Subject to any disclaimer, the term of this patent is extended or adjusted under 35 U.S.C. 154(b) by 1627 days.

(21) Appl. No.: 11/630,567

(22) PCT Filed: Jul. 25, 2005

(86) PCT No.: PCT/FI2005/000339
§ 371 (c)(1),
(2), (4) Date: Dec. 22, 2006

(87) PCT Pub. No.: WO2006/010787
PCT Pub. Date: Feb. 2, 2006

(65) Prior Publication Data
US 2008/0029525 A1 Feb. 7, 2008

(30) Foreign Application Priority Data
Jul. 26, 2004 (FI) .................................... 20041022

(51) Int. Cl.
*B31C 3/00* (2006.01)
*B31F 1/00* (2006.01)
*B29C 57/12* (2006.01)
*B31B 1/25* (2006.01)
*B31B 17/00* (2006.01)
*B65D 1/26* (2006.01)
*B29C 53/34* (2006.01)
*B31B 1/28* (2006.01)
*B29L 31/00* (2006.01)

(52) U.S. Cl.
CPC .............. *B31F 1/0038* (2013.01); *B31F 1/009* (2013.01); *B31B 2217/108* (2013.01); *B29C 57/12* (2013.01); *B31B 1/25* (2013.01); *B31B 17/00* (2013.01); *B65D 1/265* (2013.01); *B29L 2031/7132* (2013.01); *B31B 2217/082* (2013.01); *B31B 2201/2604* (2013.01); *B31B 2201/25* (2013.01); *B29C 53/34* (2013.01); *B31B 1/28* (2013.01)
USPC ............................. 264/482; 264/295; 264/339

(58) Field of Classification Search
USPC ................. 264/295, 339, 479, 480, 482, 294;
439/155, 159, 154, 153; 493/155, 159,
493/154, 153
See application file for complete search history.

(56) References Cited

U.S. PATENT DOCUMENTS

| 2,819,658 A | 1/1958 | Scott et al. |
| 3,453,162 A | 7/1969 | Turner et. al. |

(Continued)

FOREIGN PATENT DOCUMENTS

| EP | 1 060 720 A | 12/2000 |
| JP | 2-135431 U | 11/1990 |

(Continued)

OTHER PUBLICATIONS

Machine Translation of JP 2001-301737.*

(Continued)

*Primary Examiner* — Galen Hauth
(74) *Attorney, Agent, or Firm* — Birch, Stewart, Kolasch & Birch, LLP

(57) ABSTRACT

The invention relates to a method for forming a mouth roll (2) to a cup (1) made of plastic-coated board and to the cup provided with a mouth roll produced by the method. The mouth roll for stiffening the cup is produced with a suitable striking tool bending the board at the mouth of the cup. In accordance with the invention, the mouth roll is additionally stabilized by melting the plastic coating (8) of the board under heat so that the opposite surfaces of the board adhere to each other by heat-sealing in the area of the roll. Melting can be performed e.g. by hot-air blasting directed to the mouth roll at is production stage.

6 Claims, 3 Drawing Sheets

(56) References Cited

U.S. PATENT DOCUMENTS

Figure 1:
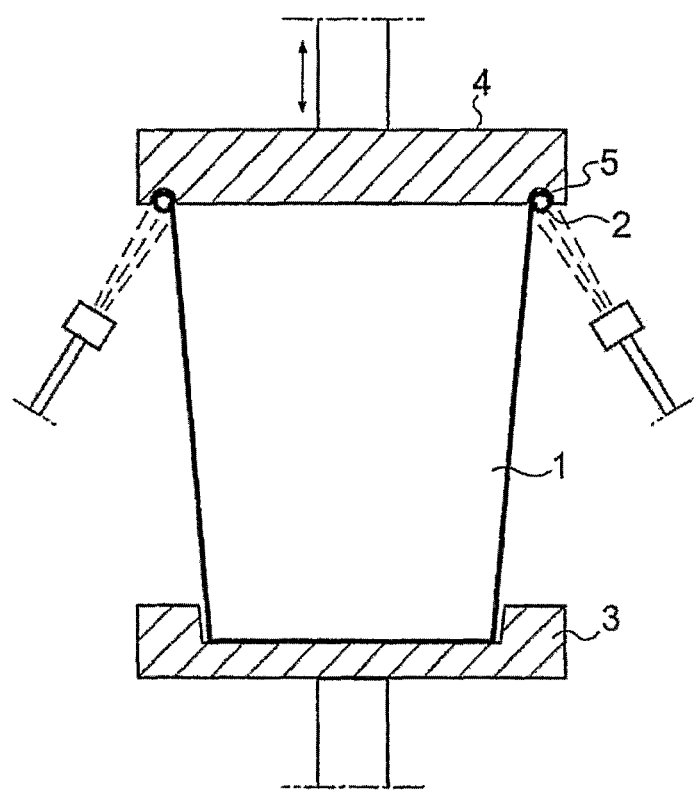

| | | | | |
|---|---|---|---|---|
| 4,187,768 | A | * | 2/1980 | Suzuki .......................... 493/109 |
| 4,540,392 | A | * | 9/1985 | Junod et al. .................... 493/303 |
| 5,271,517 | A | | 12/1993 | Bowers |
| 2002/0111260 | A1 | * | 8/2002 | Sand ................................ 493/51 |
| 2004/0065424 | A1 | * | 4/2004 | Mohan et al. .............. 162/164.1 |

FOREIGN PATENT DOCUMENTS

| JP | 9277407 | A | | 10/1997 | |
| JP | 2001-301737 | | * | 10/2001 | |
| JP | 2001301737 | A | * | 10/2001 | ............... B65D 3/02 |
| JP | 2003-200920 | A | | 7/2003 | |

OTHER PUBLICATIONS

English translation of Japanese Office Action issued on Nov. 16, 2010 in related Japanese Patent Application No. 2007-523094.

* cited by examiner

METHOD OF FORMING A MOUTH ROLL TO A CUP OF PLASTIC COATED BOARD AND A CUP MADE BY THE METHOD

The invention relates to a method of forming a mouth roll to a cup made of plastic-coated board. The invention also relates to a cup that is provided by implementing this method and is made of plastic-coated board and provided with a mouth roll for stiffening the cup. The invention relates primarily to disposable drinking cups suitable for piling in automatic dispensers.

A drinking cup made of board requires a mouth roll to provide rigidity on the one hand and to give the user drinking from the cup the desired sensation in the mouth on the other hand. A mouth roll is formed at the final production stage of the cup by means of moulding tools for bending and/or compressing the board. A moulding tool typically makes the board bend outwardly at the cup mouth and further winds it in the form of a roll, in which the board is wound in about 1-1.5 laps. In order to achieve a permanent mouth roll, the board has been heated by using a heated moulding tool while moistening the board for improved mouldability. In addition, the mouldability has been improved by using friction-reducing sliding agents, such as silicone oil.

In the applicant's view, successful mouth rolling is of paramount importance in terms of the stiffness and manipulability of a board cup. The invention has the purpose of providing a solution allowing the stiffness of a drinking cup to be further increased by means of the mouth roll. A mouth roll modified in accordance with the invention enhances the properties of the cup used in automatic dispensers, and depending on the application, allows for the use of a thinner board than before as the material of the cups.

The method of the invention, which provides a solution for achieving the objectives mentioned above, is characterised by forming a mouth roll at the mouth of the cup by bending the board and by stabilising the mouth roll by melting the plastic coating of the board under heat so that the opposite surfaces of the board are heat-sealed to each other in the area of the roll.

A waterproof insulating plastic coating is especially required on the inner surface of drinking cups made of board in order to prevent wetting of the board. Since cold drinks additionally cause condensation of the moisture contained in indoor air on the outer surface of the cup, the cup board is in most cases provided with a plastic coating protecting the board against moisture on both sides. In accordance with the invention, this plastic coating is now used for stiffening the mouth roll and thus the entire cup structure.

The coating plastic of drinking cups made of board is typically low-density polyethylene (LDPE), which provides the board with an adequate moisture barrier and also is easily heat-sealable. In fact, the skirt and the bottom of the cup are sealed by means of the sealable plastic coating of the board. In accordance with the invention, similar heat-sealing conditions can be arranged also in the area of the mouth roll, and then the plastic coatings of opposite board surfaces that have been wound by more than one single lap will melt, adhering subsequently to each other while cooling. For stabilisation of the mouth roll and to ensure adequate adhesion, the board is preferably wound by at least 1.2 laps in the roll, most advantageously by at least 1.3 laps.

When using moulding tools for rolling the mouth of the cup, one has sought to improve the mouldability of the cup board by means of heating, which usually is associated with moistening. In rapid moulding carried out as serial production for melting the plastic coating of board, the heating effect of current tools is inadequate, and as far as the applicant knows, mouth rolling has not aimed at melting the plastic until now. In fact, it is possible to wind out the mouth rolls of current cups made of plastic-coated board without damage to the material, this being an indication of the absence of any heat-seal. The invention thus requires either an enhanced heating effect on the coating plastic during the actual rolling step, or more commendably, heating of the mouth roll after the rolling step so that the coating plastic melts. The latter operation avoids the risk of melted plastic adhering to the moulding tools, which means that the sealing process will be less critical and thus easier to control.

Heat-sealing of the mouth roll based on melting of the coating plastic may be performed e.g. by hot air blasting, ultrasonic means, laser radiation or a flame sealer.

Owing to the more rigid mouth roll, a thinner cup board can be used, thus achieving saving in material, especially for drinking cups intended for cold drinks, in which the decreased thermal insulation capacity of the cup skirt does not cause any problems for the user. The same benefit can be gained also in the case of hot drinks if the cup is provided with a lug or else has a design such that the hot drink does not burn the user's fingers.

The cup of the invention, which has been produced of plastic-coated board as described above, is characterised by the opposite surfaces of the board having been adhered to each other by heat-sealing in the area of the cup mouth roll by means of the coating plastic. The heat-seal formed in the mouth roll may encircle the mouth of the cup continuously, or it may also be discontinuous so as to cover only a part of the circumference of the mouth.

Figure 2:
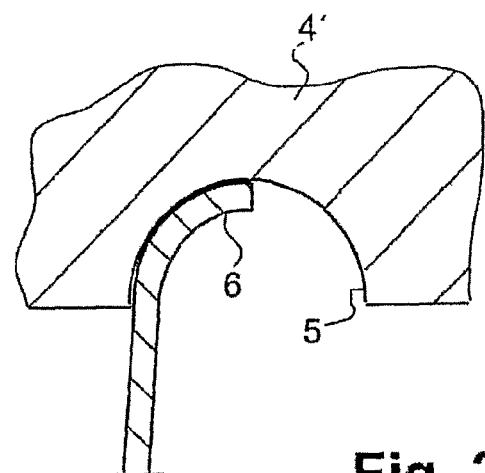
Figure 3:
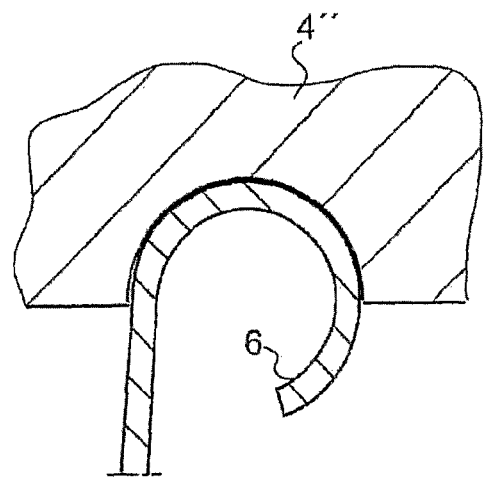
Figure 4:
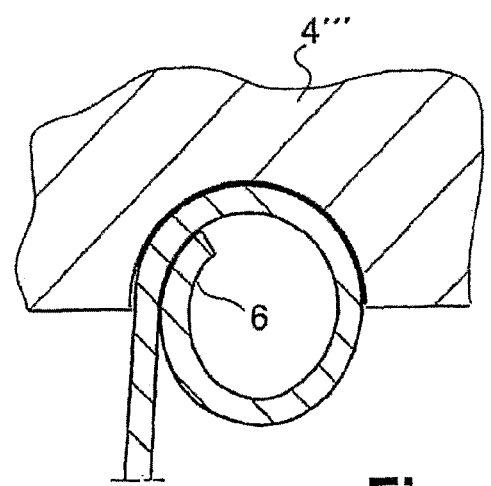
Figure 5:
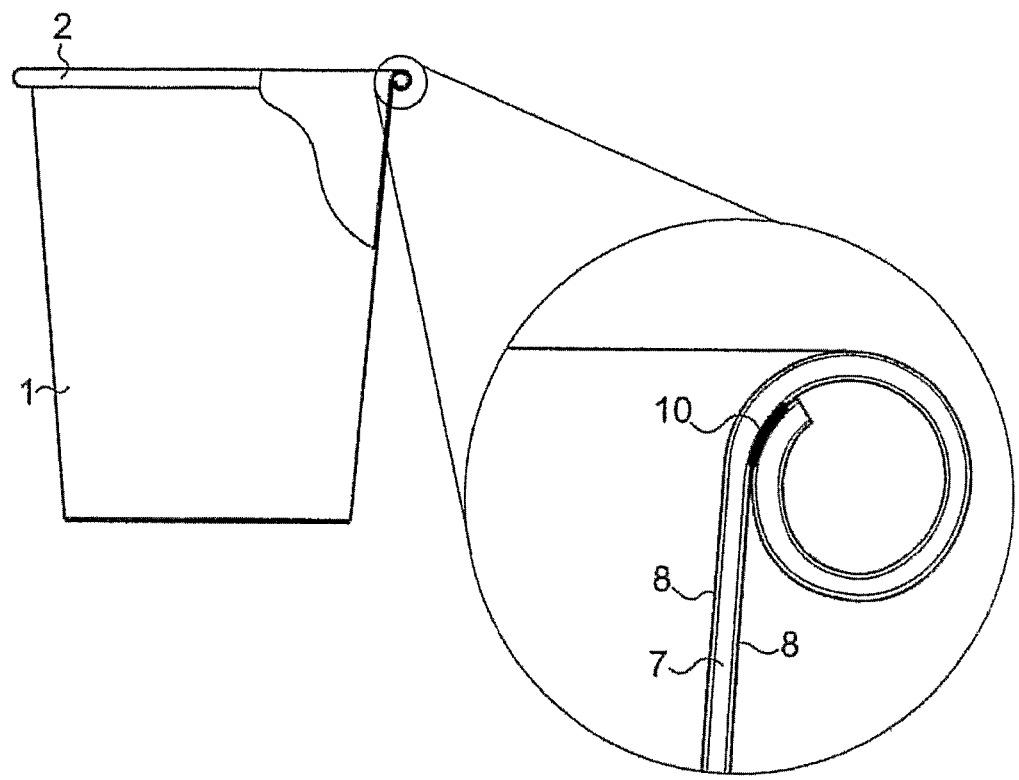

The invention is described in greater detail below by means of examples and with reference to the accompanying drawings, in which FIG. 1 illustrates the moulding of the mouth roll of the board drinking cup of the invention using a striking tool at a moulding station provided with hot air nozzles for heat-sealing of the mouth roll, FIGS. 2-4 illustrate successive work steps of the moulding of the mouth roll, and FIG. 5 illustrates a drinking cup of the invention provided with a mouth roll, the figure comprising a partial enlargement of a heat-sealed mouth roll.

In FIG. 1, a disposable drinking cup 1 made of board is supported on a stationary substrate 3 for the moulding of the mouth roll 2 in the last step. The mouth roll 2 is moulded by means of a vertically reciprocating striking tool 4, which is provided with an annular groove 5 dimensioned so as to match the mouth of the cup 1. During the moulding, the board is bent outwardly at the mouth of the cup 1 so as to be wound as a roll 2, in which the board is wound by at least about 1.2 laps, preferably 1.2-1.5 laps, in other words, the roll comprises two successive board layers over a distance of at least 0.2 laps. The mouth roll can be formed with the aid of steam damping of the board, a sliding agent such as silicone oil and also heating of the striking tool.

The mouth roll 2 is usually formed stepwise by a plurality of successive moulding movements made by the striking tool 4. FIGS. 2-4 give an example of such a procedure, in which the mouth roll 2 is moulded in three steps. When the cups 1 are made in mass production, the cups may be supported by a disc acting as the substrate 3, on which the cups move one by one to consecutive moulding stations stationary relative to the disc, where the vertically moving striking tools 4 perform the moulding of the mouth roll. An apparatus of this type for working a mouth roll is disclosed by U.S. Pat. No. 5,992,489.

FIG. 2 shows the first step of the moulding of the mouth roll, where the striking tool 4' at the first moulding station has bent the edge 6 of the board fitting into the groove 5 of the tool outwardly by about 0.3 laps. In FIG. 3, the cup has moved to the following moulding station, where, as a result of the impact of the striking tool 4″, the edge 6 of the board is wound outwardly by about 0.7 laps. In FIG. 4, the cup is located at the third moulding station, where the striking tool 4‴ has completed the moulding of the mouth roll so that the edge 6 of the board has been wound by about 1.2 laps in the roll 2.

The board 7 used for the drinking cup 1 is provided with a plastic coating 8 on both sides, as can be seen in the cross-sectional partial enlargement of the finished cup pertaining to FIG. 5. The bottom board 7 may consist e.g. of three-layered cup board having a weight of approx. 200-300 $g/m^2$, and the inner and outer coating layers 8 of the cup may be made e.g. of low-density polyethylene (LDPE) with a layer weight of e.g. 20-40 $g/m^2$. In accordance with the invention, the plastic coating 8 has been utilised for reinforcing the mouth roll 2 by adhering the opposite coating layers 8 to each other by heat-sealing during the rolling. To this end, the third moulding station corresponding to FIG. 4 has been provided with preferably movable hot-air blowers 9 shown in FIG. 1, from where a hot air flow can be directed to the base of the previously completed mouth roll 2, where the coated board is wound on itself. The hot air flow causes local melting of the coating plastic so that opposite coating layers 8 are welded to each other, forming a continuous heat-seal 10 encircling the mouth of the cup.

Instead of hot air blowing, the coating plastic can be melted for sealing of the mouth roll 2 e.g. by ultrasonic means or a laser beam directed to the base of the roll. A laser sealer may comprise a $CO_2$ laser head, which performs sealing during the mutual rotating movement of the cup and the laser head, or the cup may be surrounded by a plurality of stationary laser heads, which seam the mouth roll only at selected locations over the length of its circumference. A laser beam obtained from a point laser head can also be directed during sealing by appropriately moving mirrors.

It is obvious to those skilled in the art that the applications of the invention are not restricted to the examples above, but may vary within the scope of the following claims. Thus, for instance, in addition to heat-sealing combined with moulding of the roll as described above, the mouth roll can be heat-sealed in a separate operation performed on a previously bent mouth roll.

The invention claimed is:

1. A method for forming a cup having a mouth roll made of plastic-coated cupboard, comprising the steps of:
    forming the roll at the mouth of the cup by bending the board to a rounded configuration, at least one surface of the board being plastic-coated so that an inner wall of the cup has a plastic coating layer thereon; and
    subsequently stabilizing the roll of the rounded configuration by melting the plastic coating of the board with heat by laser radiation which is directed to the base of the roll of the rounded configuration from the underside thereof, so that the plastic coating layer of the inner wall is bonded to the outer wall of the cup to form said roll of said rounded configuration and the cup has the stabilized rounded configuration at the mouth.

2. The method as defined in claim 1, wherein the heating-melting of the coating plastic is directed to the board during the formation of the roll.

3. The method as defined in claim 1, wherein the heating-melting of the coating plastic is directed to the board after the formation of the roll.

4. The method as defined in claim 1, wherein the plastic coating is low-density polyethylene (LDPE).

5. The method as defined in claim 1, wherein
    both surfaces of the board are plastic-coated so that each of the inner wall and outer wall of the cup has a plastic coating layer thereon, and when forming the roll at the mouth of the cup, the plastic coating layer of the inner wall of the cup is bonded to the plastic coating layer of the outer wall of the cup by the laser radiation.

6. The method as defined in claim 1, wherein no further step for forming the stabilized rounded configuration is conducted.

\* \* \* \* \*